(12) United States Patent
Chiu et al.

(10) Patent No.: US 8,477,573 B2
(45) Date of Patent: Jul. 2, 2013

(54) OPTICAL PICKUP HEAD

(75) Inventors: Yi Chiu, Hsinchu (TW); Hsi-Fu Shih, Hsinchu (TW); Chen-An Lin, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 13/360,182

(22) Filed: Jan. 27, 2012

(65) Prior Publication Data

US 2012/0213051 A1 Aug. 23, 2012

(30) Foreign Application Priority Data

Feb. 23, 2011 (TW) ................................. 100105919

(51) Int. Cl.
*G11B 7/00* (2006.01)
(52) U.S. Cl.
USPC ....................................................... 369/44.12
(58) Field of Classification Search
USPC ............................................... 369/103, 44.12
See application file for complete search history.

(56) References Cited

U.S. PATENT DOCUMENTS

| | | | |
|---|---|---|---|
| 6,807,141 B2* | 10/2004 | Chang et al. | 369/112.26 |
| 7,202,464 B2* | 4/2007 | Hwang et al. | 250/214.1 |
| 7,283,448 B2* | 10/2007 | Sohn et al. | 369/112.01 |
| 7,457,206 B2* | 11/2008 | Shimano et al. | 369/44.12 |
| 7,558,161 B2* | 7/2009 | Sohn et al. | 369/44.12 |
| 2004/0032814 A1* | 2/2004 | Yee | 369/112.24 |
| 2006/0126069 A1* | 6/2006 | Cho et al. | 356/399 |
| 2009/0168625 A1* | 7/2009 | Lee et al. | 369/100 |
| 2009/0252019 A1* | 10/2009 | Chen et al. | 369/112.16 |

OTHER PUBLICATIONS

Chiu et al., Design and Fabrication of a Small-Form-Factor Optical Pickup Head, IEEE Transactions on Magnetics, vol. 45, No. 5, May 2009, p. 2194-2197.*
Shih et al., Micro objective lens with NA 0.65 for the blue-light small-form-factor optical pickup head, Optics Express, Aug. 12, 2008, vol. 16, No. 17, pp. 13150-13157.*

* cited by examiner

*Primary Examiner* — Wayne Young
*Assistant Examiner* — Brenda Bernardi
(74) *Attorney, Agent, or Firm* — Muncy, Geissler, Olds & Lowe, PLLC

(57) ABSTRACT

An optical pickup head is provided, which includes a silicon substrate, in which an aperture and an objective lens are disposed on the silicon substrate; and a laser diode (LD), a 135-degree tilted reflector, and a 135-degree tilted holographic reflector are disposed on the silicon substrate. The two 135-degree tilted reflectors and a holographic optical element (HOE) are fabricated on a slant face structure of an optical platform using a semiconductor process, so all the elements are disposed at a straight zone, and then in combination with bonding of the LD and an optical sensor element, an miniaturization objective is achieved and an optical path is shortened.

9 Claims, 5 Drawing Sheets

OPTICAL PICKUP HEAD

CROSS-REFERENCE TO RELATED APPLICATIONS

This application claims the benefit of Taiwan Patent Application No. 100105919, filed on Feb. 23, 2011, which is hereby incorporated by reference for all purposes as if fully set forth herein.

BACKGROUND OF THE INVENTION

1. Field of Invention

The present invention relates to an optical pickup head, and more particularly to a miniature optical pickup head fabricated by using the microelectromechanical technology.

2. Related Art

In recent years, with the development of the semiconductor technology, the microelectromechanical systems (MEMS) technology has many important developments. For an optical data storage system, the micro-opto-electro-mechanical (MOEM) technology provides a good method of fabricating a smaller and lighter optical data storage system.

The MEMS technology is to fabricate integrated miniature semiconductors, which combines multiple technical fields such as optics, mechanics, electronics, and material. The application range of the technology is very wide, including related industries such as opto-electronics, information, communication, and biomedicine. By utilizing the technologies, products can become miniature, and performance, quality, reliability, and added values thereof are improved, and at the same time the fabrication cost is reduced.

In a micro-optical system, a micro-optical element is integrated on a single chip, so a light beam can travel in a free space inside a miniature system. Therefore, the micro-optical system is widely applied in various opto-electronics fields. For example, when the micro-optical system is applied in an optical storage system, as the miniature optical pickup head has important influences on the whole system, when the weight and volume are smaller, the read speed can be increased.

FIG. 1 is a schematic architectural view of a conventional miniature optical pickup head. An optical pickup head 10 is a miniature optical pickup head implemented by utilizing a microelectromechanical technology, which is formed of a plurality of three-dimensional micro-optical elements. Main members of the miniature optical pickup head 10 include: a laser diode (LD) 14, adhered on a silicon (Si) substrate 17 and having a function of emitting a light source, in which a wavelength of the LD 14 is between 350 nm and 800 nm; a beam splitter 11, for separating an energy of a light beam, so that a part of light energy is reflected, and a part of light energy penetrates; a Fresnel lens 12, for making incident light beams parallel; a 45-degree tilted reflector 13, for reflecting an incident light; an objective lens 19, for focusing the incident light beams; and a Fresnel lens 15, for focusing the incident light. The beam splitter 11, and the Fresnel lenses 12 and 15 and the 45-degree tilted reflector 13 are all fabricated through the microelectromechanical technology.

An actuation principle of the optical pickup head 10 is as follows: when the optical pickup head 10 performs writing, a light emitted by the LD 14 penetrates the beam splitter 11, and then light beams are made parallel by the Fresnel lens 12, and the light is reflected by the 45-degree tilted reflector 13 and is focused on a surface of an optical disk 20 through the objective lens 19, so that data is written on the surface of the optical disk 20. When the optical pickup head 10 performs reading, a light emitted by the LD 14 penetrates the beam splitter 11 and light beams are made parallel by the Fresnel lens 12, and the light is reflected onto the surface of the optical disk 20 by the 45-degree tilted reflector 13 and the objective lens 19, and a signal reflected back from the optical disk 20 is focused by the Fresnel lens 12 and then reflected to the Fresnel lens 15 by the beam splitter 11, and is refracted and focused by the Fresnel lens 15 at the optical sensor element 16 on a surface of the silicon substrate 17 to be converted into an electrical signal for output.

However, in the optical pickup head 10, the beam splitter 11 and the Fresnel lenses 12 and 15 occupy a large layout area, so all elements cannot be arranged in a straight zone, and a relatively large area is required. Besides, the objective lens 19 also needs to be arranged additionally, so the optical pickup head 10 has a certain thickness. Therefore, the miniaturization of the optical pickup head 10 is limited, and an optical path of the optical pickup head 10 also cannot be shortened, which is not in line with the cost consideration and efficiency of the system.

SUMMARY OF THE INVENTION

Therefore, in order to solve the above problems, an objective of the present invention is to provide an optical pickup head, in which two 135-degree tilted reflectors and a holographic optical element (HOE) replace beam splitters and Fresnel lenses used in a conventional optical pickup head, so all elements are arranged in a straight zone, thereby achieving miniaturization, shortening an optical path, decreasing a cost of an optical pickup head system, and increasing a read/write efficiency of the optical pickup head.

Another objective of the present invention is to combine the objective lens and the substrate, thereby reducing a thickness of the optical pickup head, achieving miniaturization, and also decreasing a cost of assembling the optical pickup head.

In order to achieve the above objectives, the present invention provides an optical pickup head, which comprises: a substrate, having an aperture disposed thereon, inside which an objective lens is disposed; an LD, adhered on the substrate for emitting a light source, in which a wavelength of the light source is between 350 nm and 800 nm; a 135-degree tilted reflector, disposed on the substrate, and spanning the LD; an optical sensor element, disposed on the substrate, and located at a corresponding position below a mirror surface of the 135-degree tilted reflector; and a 135-degree tilted holographic reflector, disposed on the substrate, and used for astigmation and beam splitting, in which a mirror surface of the 135-degree tilted holographic reflector corresponds to the objective lens, the LD, and the 135-degree tilted reflector.

The substrate is a silicon substrate, and the 135-degree tilted reflector and the 135-degree tilted holographic reflector are fabricated on the silicon substrate through the semiconductor technology. Furthermore, the optical sensor element can also be fabricated on the silicon substrate through the semiconductor technology.

An HOE is disposed on a surface of the 135-degree tilted holographic reflector, and the HOE is a grating structure and used for achieving functions of astigmation and beam splitting. Also, the HOE is formed and fabricated on the surface of the 135-degree tilted holographic reflector through the semiconductor technology.

The advantage of the present invention is that two 135-degree tilted reflectors and an HOE are fabricated on a slant face structure of an optical platform through a method of a microelectromechanical process, so as to replace beam splitters and Fresnel lenses used in a conventional optical pickup head, such that all elements fabricated through the microelectromechanical technology are arranged at a straight zone, and further, through bonding of an LD and an optical sensor element and the objective lens disposed inside an aperture of a substrate, a thickness of the optical pickup head is reduced, thereby further achieving miniaturization, shortening an optical path, decreasing a cost of an optical pickup head system, and increasing a read/write efficiency of the optical pickup head.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The detailed contents and technical description of the present invention are further given here with reference to the embodiments. However, it should be understood that the embodiments are merely exemplary, which shall not be construed as a limit to the present invention.

Figure 1:
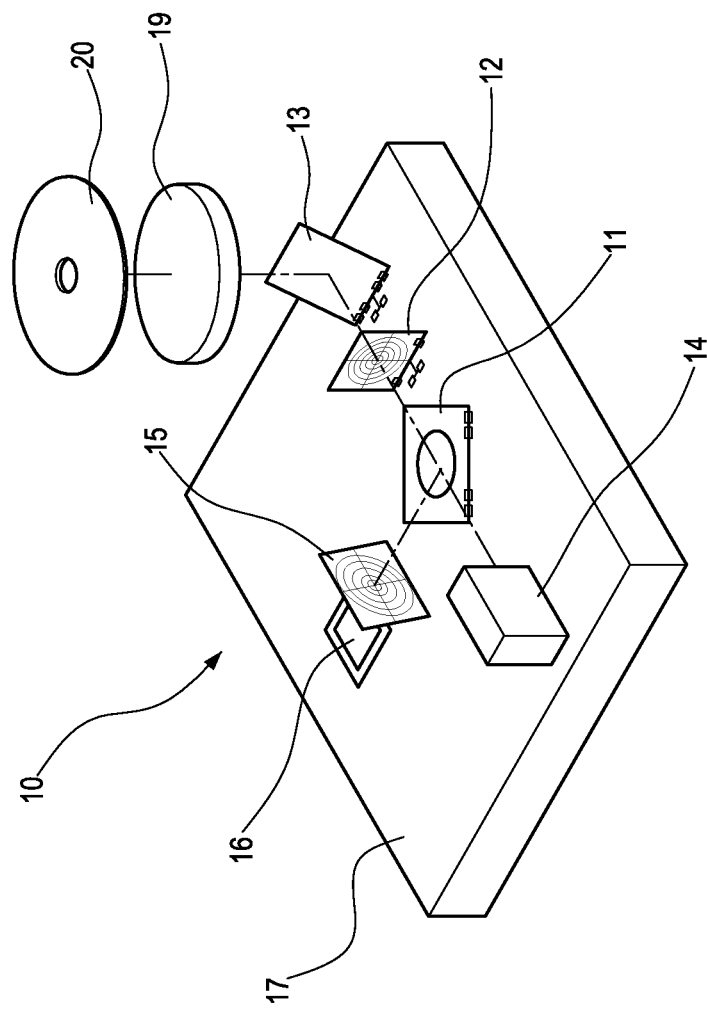
FIG. 1 is a schematic architectural view of a conventional optical pickup head.
Figure 2:
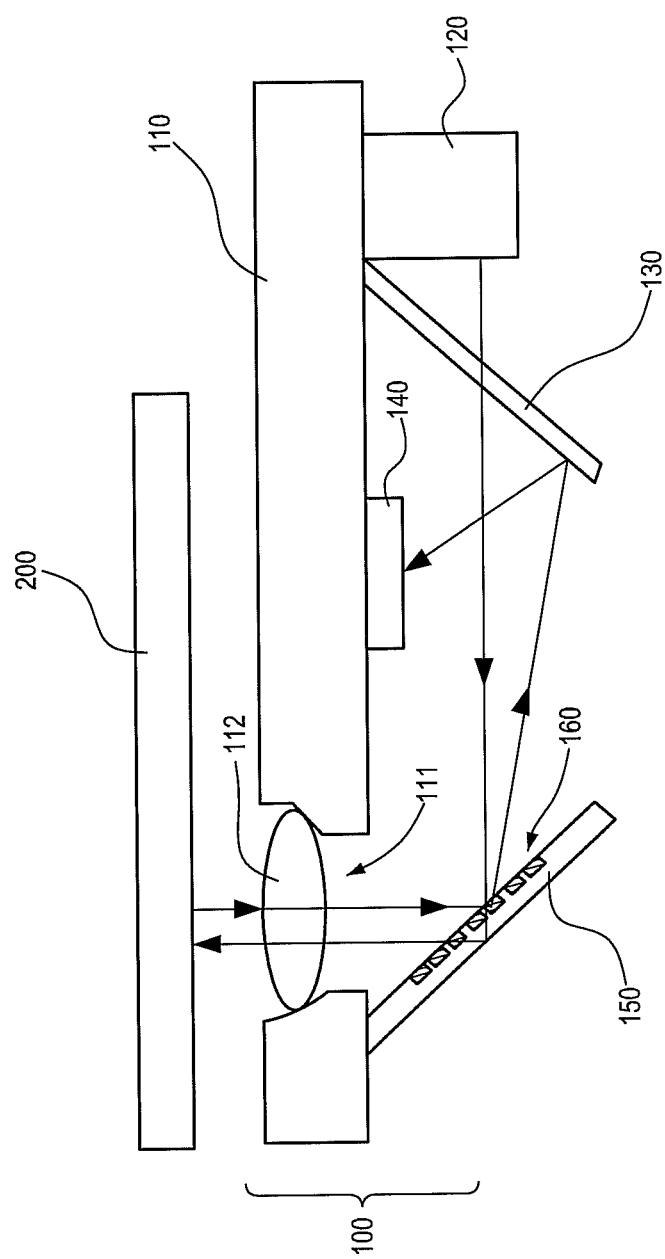
FIG. 2 is schematic architectural view according to an embodiment of the present invention.
Figure 3:
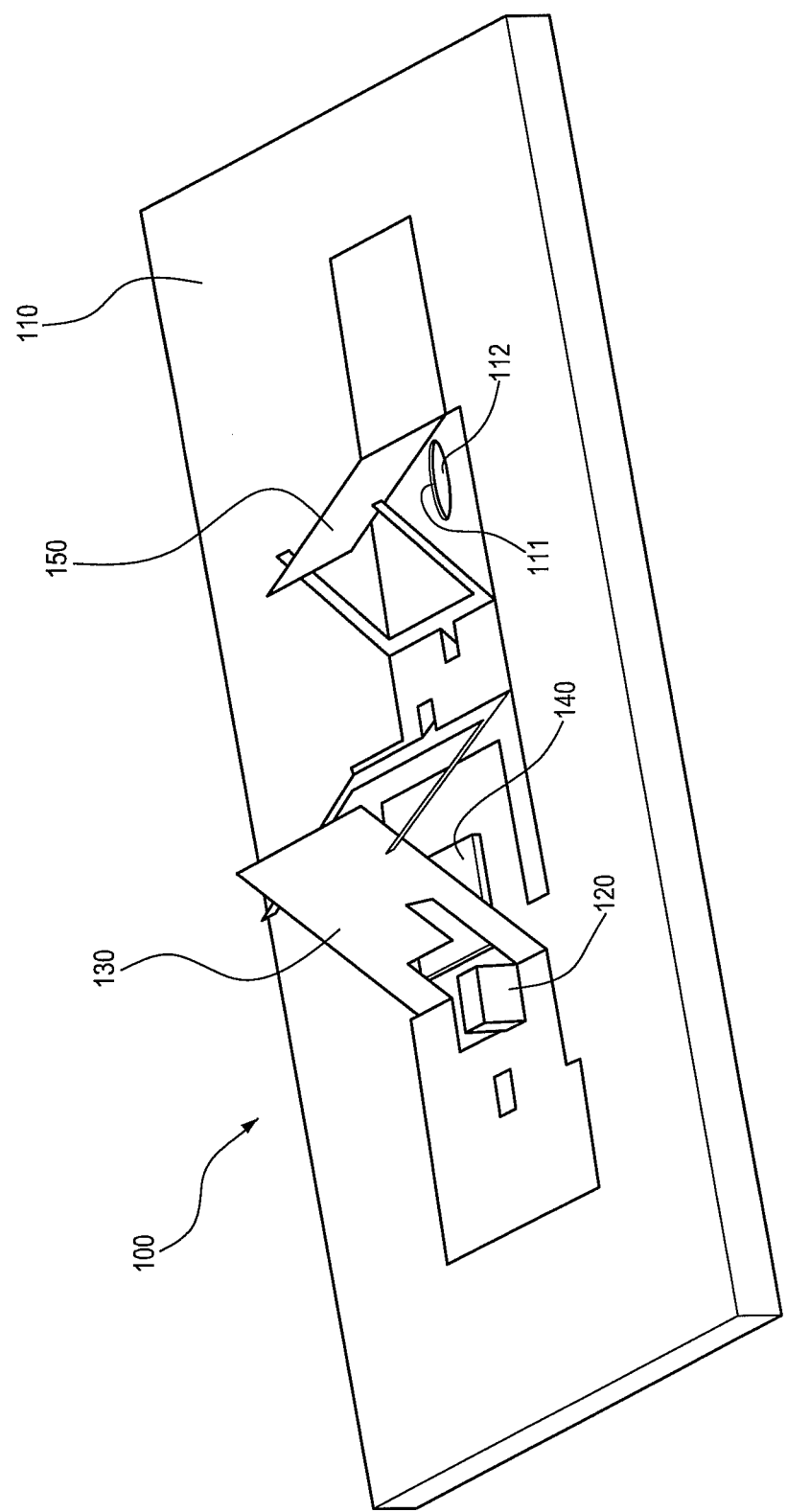
FIG. 3 is a three-dimensional schematic view according to an embodiment of the present invention.

FIG. 2 and FIG. 3 are a schematic architectural view and a three-dimensional schematic view according to an embodiment of the present invention respectively. In implementation, the optical pickup head 100 includes: a substrate 110, having an aperture 111 disposed thereon, inside which an objective lens 112 is disposed; an LD 120, adhered on the substrate 110 for emitting a light source; a 135-degree tilted reflector 130, disposed on the substrate 110, and spanning the LD 120; an optical sensor element 140, adhered on the substrate, and located at a corresponding position below a minor surface of the 135-degree tilted reflector 130, that is, a position capable of receiving a light reflected by the 135-degree tilted reflector 130; and a 135-degree tilted holographic reflector 150, disposed on the substrate 110, and used for astigmation and beam splitting, in which a mirror surface of the 135-degree tilted holographic reflector 150 corresponds to the objective lens 112, the LD 120, and the 135-degree tilted reflector 130, so all elements are arranged in a straight line.

In implementation, the substrate 110 may be a silicon substrate, the 135-degree tilted reflector 130 and the 135-degree tilted holographic reflector 150 are directly fabricated on the silicon substrate through the semiconductor process technology, and any existing semiconductor technology can be adopted to fabricate a three-dimensional micro-minor surface structure in an application on a silicon substrate of an optical platform.

Figure 4:
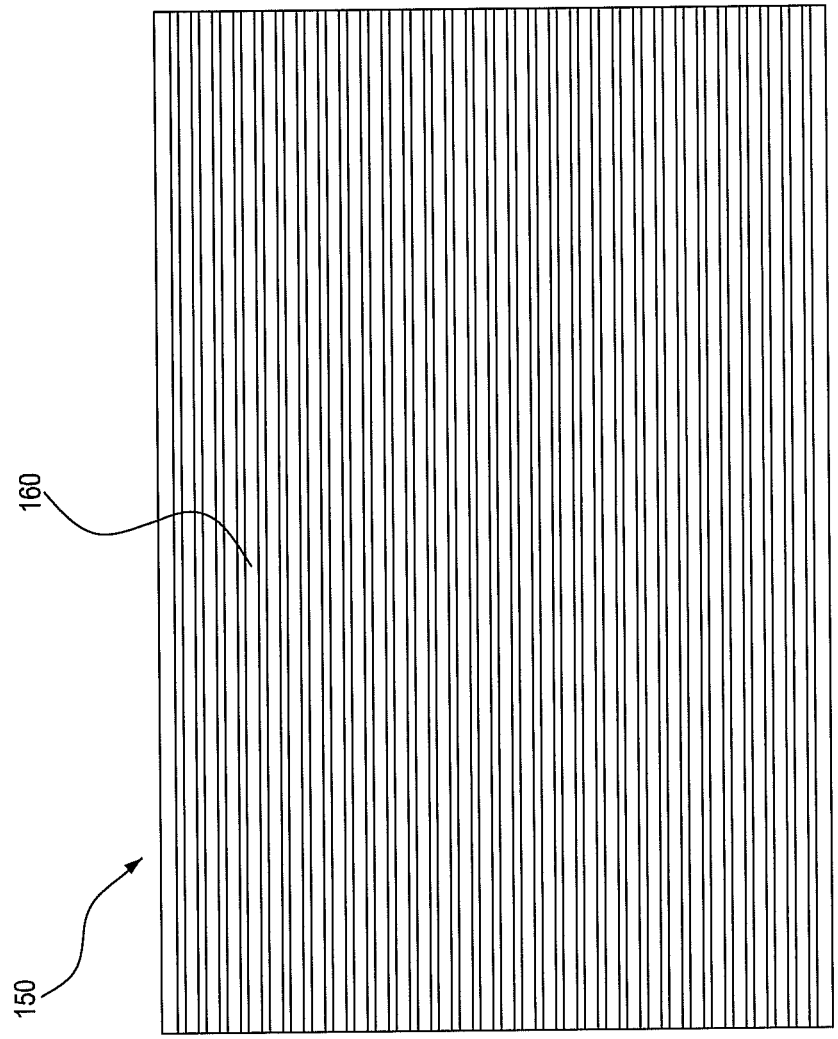
FIG. 4 is a schematic view of an HOE according to an embodiment of the present invention.

FIG. 4 is a schematic view of an HOE according to an embodiment of the present invention. An HOE 160 is disposed at a surface of the 135-degree tilted holographic reflector 150. The HOE 160 is a grating structure. A basic structure of the HOE 160 is an optical element fabricated by using a holographic principle, in which a generalized grating having irregular periods generates a diffracted light beam having an imaging function. In implementation, the HOE 160 can be formed on a surface of the 135-degree tilted holographic reflector 150 by using any existing semiconductor technology, and a grating structure having a wave band surface is formed through the semiconductor technology to serve as a diffraction element, so as to achieve functions of astigmation and beam splitting.

In the optical pickup head 100, through the two 135-degree tilted reflectors and the HOE 160, all elements fabricated through the microelectromechanical technology are arranged in a straight zone, and furthermore, through bonding of the LD 120 and the optical sensor element 140 or the optical sensor element 14 directly fabricated on the silicon substrate through the semiconductor technology, all elements of the optical pickup head 100 are arranged in a straight zone, thereby achieving miniaturization, shortening an optical path, decreasing a cost of an optical pickup head system, and increasing a read/write efficiency of an optical pickup head.

In implementation, a wavelength of a light source of the LD 120 is between 350 nm and 800 nm, and the LD 120 and the optical sensor element 140 are adhered to a surface of the silicon substrate 110 by using a metal or polymer adhesive.

The optical pickup head 100 is formed of multiple three-dimensional slant face structures and other optical elements assembled on the platform, so in implementation, the substrate 110 can adopt a Silicon On Insulator (SOI) substrate having nearly zero stress and a thick structure. Therefore, micro-minor surfaces of the 135-degree tilted reflector 130 and the 135-degree tilted holographic reflector 150 can be fabricated through any existing semiconductor processing method and assembly mode, thereby avoiding warping that might occur in fabrication using general polysilicon.

Figure 5:
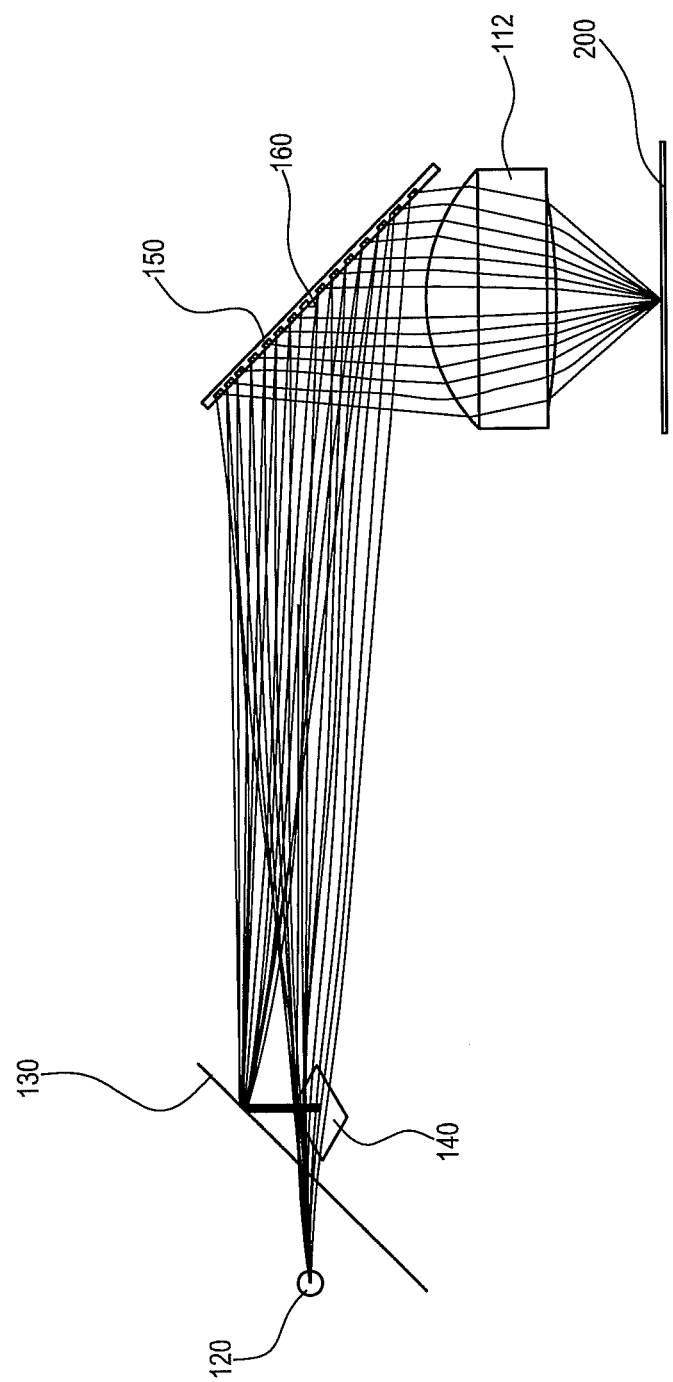
FIG. 5 is a schematic view of an optical path according to an embodiment of the present invention.

FIG. 5 is a schematic view of an optical path according to an embodiment of the present invention. First, when the optical pickup head 100 performs writing, a light emitted by the LD 120 directly reaches the 135-degree tilted holographic reflector 150, the astigmation and beam splitting reflection of the light are performed through the HOE 160, the light is focused to a surface of an optical disk 200 through the objective lens 112, so that a data is written on the surface of the optical disk 200. In the entire writing action, the optical pickup head 100 is in a multi-light-beam high energy state.

Next, when the optical pickup head 100 performs reading, a light emitted by the LD 120 directly reaches the 135-degree tilted holographic reflector 150, so the light is reflected, the light is focused onto the surface of the optical disk 200 through the objective lens 112, the signal light reflected back from the surface of the optical disk 200 passes through the objective lens 112, and the astigmation and beam splitting reflection of the signal light are performed through the HOE 160 on the surface of the 135-degree tilted holographic reflector 150, and finally the light is reflected to the optical sensor element 140 by the 135-degree tilted reflector 130, so the signal light carrying the data of the optical disk 200 is converted into an electrical signal for output. In the entire reading action, the optical pickup head 100 is in a multiple-light-beam low energy state.

Therefore, the optical pickup head of the present invention has advantages such as light weight, small volume, simple structure, and short optical path, and takes cost into consideration, thereby effectively increasing a read speed of the optical pickup head.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical pickup head, comprising:
   a substrate, having an aperture disposed thereon, wherein an objective lens is disposed inside the aperture;
   a laser diode (LD), adhered on the substrate and used for emitting a light source;
   a 135-degree tilted reflector, disposed on the substrate, and spanning the LD;
   an optical sensor element, disposed on the substrate, located at a corresponding position below a mirror surface of the 135-degree tilted reflector; and
   a 135-degree tilted holographic reflector, disposed on the substrate, used for astigmation and beam splitting, wherein a mirror surface of the 135-degree tilted holographic reflector corresponds to the objective lens, the LD, and the 135-degree tilted reflector.

2. The optical pickup head according to claim 1, wherein the substrate is a silicon substrate.

3. The optical pickup head according to claim 1, wherein the substrate includes a silicon on insulator (SOI) substrate.

4. The optical pickup head according to claim 2, wherein the 135-degree tilted reflector and the 135-degree tilted holographic reflector are fabricated on the silicon substrate through a semiconductor technology.

5. The optical pickup head according to claim 2, wherein the optical sensor element is fabricated on the silicon substrate through a semiconductor technology.

6. The optical pickup head according to claim 1, wherein a holographic optical element (HOE) is disposed on a surface of the 135-degree tilted holographic reflector.

7. The optical pickup head according to claim 6, wherein the HOE is a grating structure for achieving functions of astigmation and beam splitting.

8. The optical pickup head according to claim 7, wherein the HOE is formed on the surface of the 135-degree tilted holographic reflector through a semiconductor technology.

9. The optical pickup head according to claim 1, wherein a wavelength of the LD is between 350 nm and 800 nm.

* * * * *